United States Patent [19]

Boireau

[11] 4,358,767
[45] Nov. 9, 1982

[54] METHOD OF TRACKING FOR TELECOMMUNICATIONS ANTENNAE

[75] Inventor: Claude Boireau, Grenoble, France

[73] Assignee: Neyrpic, Grenoble, France

[21] Appl. No.: 220,488

[22] Filed: Dec. 29, 1980

[30] Foreign Application Priority Data

Jan. 8, 1980 [FR] France .................. 80 00324

[51] Int. Cl.³ .............................................. G01S 5/02
[52] U.S. Cl. ........................ 343/117 R; 343/100 AD
[58] Field of Search ...... 343/117 R, 100 AD, 100 ST

[56] References Cited

U.S. PATENT DOCUMENTS

| 3,419,868 | 12/1968 | Clayton, Jr. | 343/117 R |
| 3,842,420 | 10/1974 | Rabow | 343/117 R |
| 4,276,553 | 6/1981 | Schaefer | 343/112 R |

Primary Examiner—Theodore M. Blum
Attorney, Agent, or Firm—Pollock, Vande Sande & Priddy

[57] ABSTRACT

A method of tracking for telecommunications antennae.
It consists in carrying out continuous measurements along each axis (X,Y) of displacement and in returning backwards by a measured amount before proceeding to change the axis.

2 Claims, 2 Drawing Figures

METHOD OF TRACKING FOR TELECOMMUNICATIONS ANTENNAE

BACKGROUND OF THE INVENTION

The present invention relates to a new method of tracking of the type known as "step-by-step" or "step-tracking" by telecommunications antennae in particular.

Satellite telecommunications antennae are movable about two axes at right angles. A position control device is used to ensure permanent aiming of the antenna in the direction of the satellite. The development of low-cost stations and the employment of more and more stable geostationary satellites has enabled the development of less sophisticated position controls known as having "step-by-step" tracking or as "step-tracking".

The tracking unit or position control device placed on the market hitherto by the Applicants, operates as follows:

a tracking receiver delivers a d.c. voltage proportional to the power of the beacon signal received from the satellite; hence this voltage is a maximum when the antenna is aimed in the direction of the satellite;

a unit known as the driving and control unit measures this voltage and controls a set of asynchronous motors which enable the antenna to be brought into the direction of the satellite in accordance with the following cycle:

(a) measure the output voltage of the receiver;
(b) displace the antenna along one axis and in a predetermined direction for a measured time;
(c) a new measurement of the output voltage of the receiver is taken;
(d) compare the new measurement with the previous measurement;
(e) decision:
 if the voltage has increased, displacement along the same axis for the same measured time and in the same direction;
 if the voltage has diminished, displacement along the same axis for the same measured time but in the contrary direction;
(f) a new measurement, a new comparison, a decision to continue displacement in the same direction as long as the voltage continues to increase;
(g) when the voltage received has dropped, a decision to change the axis of displacement by 90°, a repetition along this orthogonal axis of the foregoing steps a) to f); when
(h) a decision to stop tracking from the voltage received has dropped.

Such a tracking method presents certain disadvantages:

the antenna is positioned at the end of the cycle in a position close to but not in the exact direction of the satellite since it is a drop in voltage which terminates the tracking;

this method is slow since the antenna is stopped during the measurement and hence it reacts incorrectly to external disturbances;

a tracking cycle includes numerous starts and stops of the motors, resulting in considerable wear of these parts, as well as in the driven mechanical structures.

SUMMARY OF THE INVENTION

An object of the invention is a method of tracking which enables these disadvantages to be considerably reduced. It is characterized in controlling the driving unit of the antenna so as to aim it in the direction of the satellite in accordance a made up of the following steps cycle:

(a) measure the output voltage of the receiver;
(b) displace the antenna along a first axis, in a certain direction;
(c) during the displacement, successive measurements of the voltage with successive comparisons of each measurement with the previous one;
(d) when the last measurement is found that measurement which is less than the previous one, change of the direction of displacement along the same axis;
(e) during the new displacement, successive measurements of the voltage with successive comparisons of each measurement with the previous one;
(f) when the last measurement is found again that measurement which is less than the previous one, stop and then displace in the reverse direction along the same axis for a measured time, depending upon the driving speed of the antenna along this axis, then change the axis by 90°;
(g) repeat, along this orthogonal axis but with another measured time which is a function of the driving speed along this axis, the steps a) to f) with either stopping of the tracking or repetition of a complete cycle a) to g), the number of cycles of this type before stopping the tracking is programmable by the user.

The time measured under Point (f) is advantageously the time which corresponds with the displacement in the reverse direction in accordance with the said Point (f), which provides the best aim at the end of the cycle. This time will, for example, be determined experimentally for each axis by setting it equal to zero and by carrying out a cycle limited to the axis in question; the distance along the axis in question from the point obtained to the real known position of the satellite will then be that which corresponds with the said measured time along this axis.

The invention will be better understood with the aid of the description below of an embodiment by reference to the attached drawings in which:

DETAILED DESCRIPTION OF AN EMBODIMENT

Figure 1:
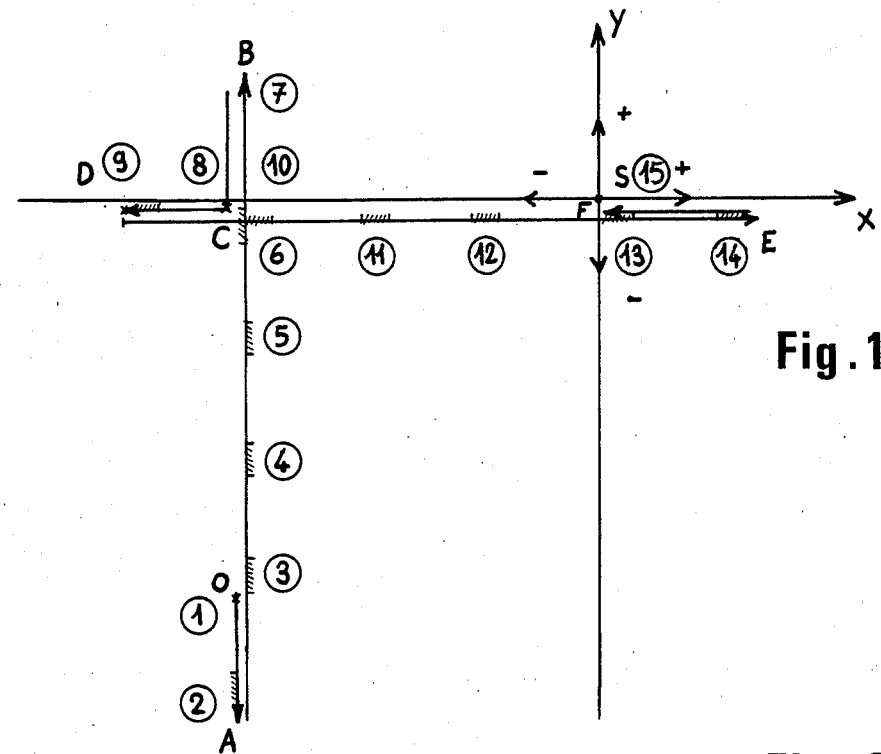
FIG. 1 is a representation of a tracking cycle in accordance with the invention, in a system of orthogonal axes (X,Y) having as its centre the satellite (S) which is to be tracked.

In FIG. 1 the exact direction of aim towards the satellite is designated by S and the initial direction towards which the antenna is aimed is designated by O. The two orthogonal axes of displacement along which the aim of the antenna can be displaced are designated by SX and SY, being horizontal and vertical respectively, and the respective directions of displacement in the direction of these axes are designated by the sign (+) towards the right for the direction SX and upwards for the direction SY respectively and the sign (−)

towards the left for the direction SX and downwards for the direction SY respectively.

In accordance with the invention a cycle of operations for tracking the satellite (direction S) from the starting position 0 is as follows:

1. Measurement of the voltage being received by the receiver at the point 0: V1
2. Displacement of the direction of aim of the antenna in the direction (Y−), that is, along OA, measurement of the voltage during the course of displacement, say, V2, and comparison with the previous measurement;
   One obtains: V2 < V1
   Which orders a change in the direction of displacement, still in the direction Y:
3. Displacement along the direction (Y+), measurement during the course of displacement, say: V3
   comparison; one obtains: V3 > V2
4. Continuation of displacement along (Y+), measurement during the course of displacement, say: V4
   comparison; one obtains: V4 > V3
5. Continuation of displacement along (Y+), measurement during the course of displacement, say: V5
   comparison; one obtains: V5 > V4
6. Continuation of displacement along (Y+), measurement during the course of displacement, say: V6
   comparison; result: V6 > V5
7. Continuation of displacement along (Y+) measurement during the course of displacement, say: V7
   comparison; result: V7 < V6
8. Decision consequent upon the negative result of the preceding comparison: changing of the direction of displacement at the point B and displacement BC along the direction (Y−) for a measured time t1 which is a function of the speed of displacement along the direction Y and which has been determined experimentally as will be made clear below.
   Measurement at the point C, say: V8
9. Displacement CD along (X−), measurement during the course of displacement, say: V9
   comparison; result: V9 < V8
   Changing of the direction of displacement since the voltage received has dropped;
10. Displacement along (X+), measurement during the course of displacement, say: V10
    comparison, say: V10 > V9
11. Continuation of displacement along (X+), measured during the course of displacement, say: V11
    comparison; result: V11 > V10
12. Displacement continued along (X+), measurement during the course of displacement, say: V12
    comparison; result: V12 > V11
13. Displacement continued along (X+), measurement during the course of displacement, say: V13
    comparison; result: V13 > V12
14. Displacement continued along (X+), measurement during the course of displacement, say: V14
    comparison result: V14 < V13
15. Decision consequent upon this negative result: changing at the point D of the direction of displacement and displacement EF in the direction (X−) for a new measured time t2 which is a function of the speed of displacement along the direction X and which has advantageously been determined experimentally as made clear below.

The tracking is then stopped, the cycle having been terminated. If it is desired to approach even closer to the real direction of the satellite S, then program the execution of one or more further identical cycles, before total stopping of the tracking.

In order to determine the measured times t1 and t2 which provide the best aim one will advantageously proceed as follows:

The satellite S being in a known direction of aim, determined by simulation in a traditional manner:

for the determination of the time t1: execution of the cycles Nos. 1 to 7, stopping at the point B, measurement of the real distance with respect to the satellite S taken along the axis Y, calculation by means of the speed v1 of displacement of the antenna along Y, of the corresponding time t1;

for the determination of the time t2: the same method as for the time t1 but along the axis X and with calculation of the time t2 by means of the speed v2 of displacement of the antenna along X.

It will be observed that the measured times t1 and t2 may have the same value t, in particular when the speeds of displacement along the axes X and Y are the same.

Figure 2:
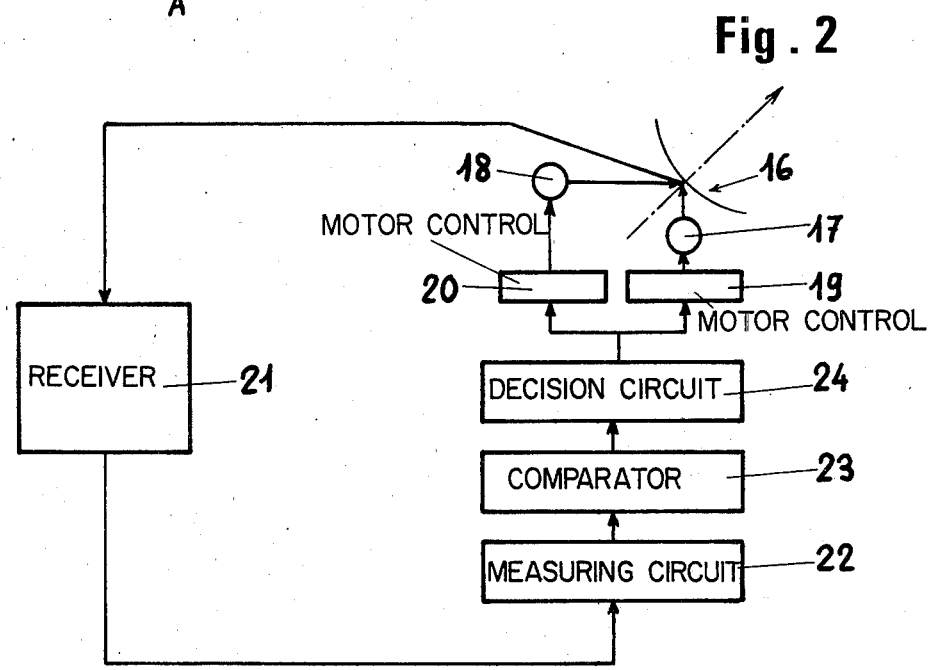
FIG. 2 represents as a block diagram the device employed for putting the invention into effect.

FIG. 2 is a block diagram of a unit which may be employed for putting the invention into effect. In this Figure the mechanical structure of the antenna has been designated by the reference 16, the asynchronous motors for driving along the orthogonal axes X and Y being designated by the reference 17 and 18 and their power control blocks by 19 and 20.

To the antenna 16 is connected a receiver 21 which converts the signal received by it from the beacon of the satellite into a d.c. voltage proportional to the power of the said signal, measured by an electronic device 22. With the operational block 22 is associated a conventional operational block 23 for comparison between two successive measurements, which in turn is connected to a block 24 for decision and working out of the sequences, consisting of a conventional computer. The whole of the blocks 22,23,24 is grouped in one electronic unit, the central element of which is a microprocessor, and it acts upon the control units 19 and 20.

The invention finds its main application in the field of telecommunications and may be applied to any process control which is characterized by seeking an extremum.

I claim:

1. A method of tracking by antenna, characterized in controlling the driving unit (17, 18) of an antenna (16) so as to aim it in the direction of the satellite in accordance with the following steps:
   (a) measure the output voltage from a receiver;
   (b) displace the antenna along a first axis, and in a certain direction;
   (c) during the displacement, successively measure the output voltage and successively compare each measurement with the previous one;
   (d) when a measurement is found to be less than the previous one, change the direction of displacement along the same axis;
   (e) during the new displacement, successively measure the output voltage and successively compare each measurement with the previous one;

(f) when a measurement is found to be less than the previous one, stop and then displace in the reverse direction along the same axis for a measured time t1, depending upon the driving speed of the antenna, along this axis and determined so as to be that which provides the best aim at the end of the cycle, then change the axis by 90°;

(g) repeat along this orthogonal axis with another measured time t2 which is a function of the driving speed along this axis and is determined so as to be that which provides the best aim at the end of the cycle, of the steps (a) to (f) with either stopping of the tracking or repetition of a complete cycle (a) to (g), the number of cycles of this type before stopping the tracking being programmable by the user.

2. A method of tracking as in claim 1, characterized in that each of the said measured times (t1 and t2) is determined by setting it equal to zero, by thereupon carrying out a cycle limited to the axis in question (X or Y) and than measuring the distance along the axis in question from the position of aim obtained, to the real known position of the satellite.

* * * * *